United States Patent [19]
Wedral et al.

[11] 4,442,104
[45] Apr. 10, 1984

[54] COLORING OF FRUIT

[75] Inventors: Elaine R. Wedral, Brookfield; Richard M. Hopefl; Rufus A. Ivie, both of New Milford, all of Conn.

[73] Assignee: Societe d'Assistance Technique pour Produits Nestle S.A., Lausanne, Switzerland

[21] Appl. No.: 455,597

[22] Filed: Jan. 4, 1983

[51] Int. Cl.³ .................. A23L 1/275; A23L 1/212
[52] U.S. Cl. ................................ 426/250; 426/252; 426/102; 426/103; 426/540; 426/639
[58] Field of Search ............... 426/250, 540, 102, 103, 426/639, 252

[56] References Cited
U.S. PATENT DOCUMENTS

| | | | |
|---|---|---|---|
| 2,624,676 | 1/1953 | Mako | 426/250 |
| 2,692,831 | 10/1954 | Weckel et al. | 426/250 |
| 3,307,954 | 3/1967 | Blakemore | 426/639 |
| 3,406,075 | 10/1968 | Zukerman | 426/639 |
| 3,451,824 | 6/1969 | McLeod | 426/250 |
| 4,115,595 | 9/1978 | Jordan | 426/250 |

*Primary Examiner*—Jeanette M. Hunter
*Attorney, Agent, or Firm*—Vogt & O'Donnell

[57] ABSTRACT

A process for artificially coloring fruit wherein an aqueous medium containing the fruit is treated with a colorant and a hydrolyzable tannin at an adequate temperature until the desired quantities of colorant and hydrolyzable tannin are absorbed by the fruit, the pH is lowered at least to a value at which the colorant becomes substantially insoluble, after which the pH is raised gradually while ensuring that the pH of the inner parts of the fruit does not exceed 7 and finally the fruit is separated from the aqueous medium.

10 Claims, No Drawings

COLORING OF FRUIT

The present invention relates to a method of colouring fruits in which the migration of the colour therefrom is prevented.

Cherries which are artificially coloured are commonly known as no-bleeding sweet cherries and are used in such commodities as canned fruits: they are usually coloured with erythrosine.

Traditionally, cherries are brined in aqueous $SO_2$ media which allows the cherries to be bacteriostatically stored for several months. Although fresh cherries are heterogeneously coloured by their own naturally occurring anthocyanin pigments the aqueous $SO_2$ brine-bleaches the fruit to a homogeneous yellow colour. In this condition the fruit may be coloured by a food dye to a uniform colour shade. Of the large number of cherry varieties, "Maraschino type" cherries which do not possess the usual cherry red colour, are commonly used in the U.S.A. and France for being artificially coloured. However a problem with such artificially coloured cherries is that the colour tends to migrate out of the cherries and this is particularly unsatisfactory when the cherries are used in admixture with pale coloured fruits such as peaches and pears because the colour migrating out colours the peaches and pears as well as the packing medium, which renders the canned fruit mixture undesirable in appearance to the consumer.

Traditionally this problem has been overcome by dyeing the cherries in a solution containing erythrosine and removing any unbound dye by a technology relying on multiple washing steps. This procedure is time and energy consuming and extremely laborious. The small amount of dye remaining is retained by the cherries but the pale coloured cherries are not visually appealing and any natural cherry blemishes are very evident.

We have surprisingly found that cherries and other fruits having a very satisfactory colour which does not migrate can be obtained by fixing the colourant with a hydrolysable tannin.

Accordingly, the present invention provides a process for artificially colouring fruit characterised in that an aqueous medium containing the fruit is treated with a colourant and a hydrolysable tannin at an adequate temperature until the desired quantities of colourant and hydrolysable tannin are absorbed by the fruit, the pH is lowered at least to a value at which the colourant becomes substantially insoluble, after which the pH is raised gradually while ensuring that the pH of the inner parts of the fruit does not exceed 7 and finally the fruit is separated from the aqueous medium.

Fruits that may be coloured by the process of this invention are naturally coloured fruits such as ordinary red cherries which have been bleached by a brining process in an aqueous $SO_2$ medium, including secondary bleached cherries, or they are naturally pale-coloured fruits such as peaches, apples, pears, bananas, grapes or pineapples. However they are preferably cherries of the variety Bigarreaux Napoléon which do not possess the normal cherry red colouration but which have been brined in an aqueous $SO_2$ medium. The fruits which have been brined are generally desulphited before being added to the aqueous medium used in the process of this invention.

By "hydrolysable tannin" in this invention we mean an ester of a sugar, usually glucose, with one or more trihydroxybenzene carboxylic acids. Examples of such polyhydroxylphenolic compounds which may be used are tannic acid having the empirical formula $C_{76}H_{52}O_{46}$ and other related compounds. Products containing tannic acid such as tea extract and instant tea powder may also be used. The fruit is preferably treated with the hydrolysable tannin before the colourant is added although it is possible to add the hydrolysable tannin at any stage or between any stage of the colouring process, conveniently before adjusting the pH. For example the tannin may be added together with the dye, in a separate operation after dyeing or by repeated addition in a dyeing and fixation operation.

The colourant should be food-acceptable and is conveniently a natural pigment or a dye containing carboxyl groups. Examples of pigments are the betalains, vulgaxanthans, bixin (annatto), norbixin (annatto) and all other natural or nature-identical pigments with one or more carboxy functional groups. Examples of dyes are erythrosine and all other such food-acceptable dyes containing one or more carboxyl functional groups.

The quantity of fruit in the aqueous medium is generally determined by practical considerations and conveniently from 0.5 to 4.0 parts, preferably 1.0 to 2.0 parts by weight of aqueous medium are used per part by weight of the fruit.

By "adequate temperature" in this invention we mean a temperature from 15° C. to the boiling point.

Conveniently the fruit and the aqueous medium are brought together at ambient temperature. When the fruit is coloured with a dye the mixture is advantageously heated to an elevated temperature above 75° C., preferably above 90° C. and especially to the boil. However, when the fruit is coloured with a natural pigment which is more heat labile than a synthetic dye, lower temperatures may be used for the treatment with both the pigment and the tannin.

The hydrolysable tannin is suitably added to the fruit in the aqueous medium at ambient temperature and, if desired heating the mixture. The treatment with the hydrolysable tannin is conveniently carried out until substantially all the hydrolysable tannin has been adsorbed. This may be achieved by maintaining the elevated temperature for a period of up to 4 hours, preferably from 15 minutes to 3 hours and especially from 1 to 2 hours.

Longer periods of time are usually necessary at lower temperatures. Optionally the desired absorption may be achieved by maintaining at a temperature from 95° C. to the boiling point for a short period of time, for instance from 15 to 45 minutes, and allowing the mixture to set for a prolonged period, for example overnight.

The amount of hydrolysable tannin used depends on whether light or dark coloured fruit is desired as well as on the particular tannin used and the form in which it is added to the fruit. Generally, the pure hydrolysable tannin, for example, tannic acid is used in an amount from 0.01% to 3.0%, preferably from 0.05% to 2.0% and especially from 0.1% to 1.0% by weight based on the weight of the fruit. When the hydrolysable tannin is added in the form of instant tea powder, the tea powder may be used in an amount from 0.001% to 0.3% by weight, preferably from 0.005% to 0.2% by weight and especially from 0.01% to 0.1% by weight based on the weight of the fruit. When the hydrolysable tannin is added in the form of a tea extract the tea extract may be used in an amount from 2% to 80% by weight, preferably from 5% to 50% by weight and especially from 10% to 30% by weight based on the weight of the fruit.

After the treatment with the hydrolysable tannin the fruit is advantageously drained and rinsed with water before adding fresh water.

The treatment with the colourant is conveniently carried out until the colourant is sufficiently and uniformly absorbed by the fruit. This may be achieved by adding the colourant to the mixture at the elevated temperature and maintaining the elevated temperature for a period of up to 2 hours, preferably from 15 to 60 minutes. In the case of natural pigments, lower temperatures may be used in which case longer periods of time are necessary. Optionally the desired absorption may be achieved by maintaining at a temperature from 95° C. to the boiling point for a short period of time, for instance from 15 to 45 minutes, and allowing the mixture to set for a prolonged period, for example overnight. The colourant may be used in an amount from 0.001% to 1.00% by weight, preferably from 0.005% to 0.50% by weight, and especially from 0.007% to 0.25% by weight based on the weight of the fruit.

After treatment with the colourant, the pH is conveniently lowered to not less than 2.0, for instance not less than 2.5, and is preferably lowered so that it has a value from 3 to the pH at which the colourant becomes insoluble. The desired pH is conveniently obtained by adding the appropriate proportion of a food-acceptable acid such as citric acid. An elevated temperature is desirably maintained for up to 1 hour, preferably from 25 to 45 minutes at the reduced pH.

After the reduction in pH the fruit is advantageously drained and rinsed with water before adding fresh water.

The pH is then raised gradually at the elevated temperature conveniently to not more than 9 and preferably not more than 8, suitably over a period of from 10 minutes to 1 hour and desirably from 15 to 40 minutes by the addition of a food-acceptable alkaline material, for example, sodium hydroxide solution.

After the pH has been raised, the fruit is again advantageously drained and rinsed with water before adding fresh water, and, if desired, heated, before draining and rinsing once more. Beneficially, the pH is lowered again by adding further water, followed by a food-acceptable acid and then heating to the elevated temperature and maintaining at the reduced pH for a period from for example 10 to 30 minutes. Preferably, a pH of 3.2 to 3.6 should be maintained at the elevated temperature.

Afterwards the fruit may be drained and rinsed with cold water and conveniently stored at a pH which is preferably from 2.9 to 3.0 prior to being further used in production.

Optionally, an edible calcium salt may be added at the stages where the pH is adjusted. The calcium salt may be the salt of an edible organic acid such as lactic, gluconic, malic, citric or fumaric acid, or a salt of an edible inorganic acid. The amount of the edible calcium salt that is used at each stage may be from 0.025% to 3.0%, preferably from 0.05% to 1.5% and especially from 0.075% to 0.75% by weight based on the weight of the fruit.

In addition, if desired, a water-dispersible polymer e.g. an acidic polymeric protein or polysaccharide containing carboxyl groups such as a pectin, an alginate, a gelatin or carboxymethylcellulose may be added before or after the addition of the hydrolysable tannin. Preferably, the polymer is a lowmethoxy pectin having a degree of esterification of less than 50% which may be conveniently employed as the powder, suitable powders being solid commercially by Obipektin under the trade name "Purple Ribbon". The polymer may conveniently be added as an aqueous solution containing from 1% to 10% by weight and preferably from 4% to 6% by weight of polymeric protein based on the weight of water.

An important feature of the present invention concerns secondary bleached cherries i.e. badly bruised cherries which have been subjected to a second bleaching by a further brining process in an aqueous $SO_2$ medium containing a strong oxidising agent such as peracetic acid. Such secondary bleached cherries cannot normally be successfully coloured for use in canned fruits, but this can be done in accordance with the present invention.

The following Examples further illustrate the present invention. Parts are expressed by weight except where stated.

EXAMPLE 1

1000 parts of cherries and 1500 parts water in a container were subjected to a sulphur dioxide brining treatment after which the sulphur dioxide was removed by standard leaching and boiling procedures until the residual sulphur dioxide was 500 ppm. The final rinse water was drained off.

The container was refilled with 1500 parts water. 5 parts of tannic acid were added and the mixture was boiled for 1½ hours after which time the tannic acid had been absorbed by the cherries. The cherries were drained and rinsed for 10 minutes with water after which the rinse water was drained off.

The container was refilled with 1500 parts water and brought to the boil. 0.125 parts of erythrosine and then 1 part of calcium chloride were added and the pH adjusted to 4.4 with citric acid. The mixture was boiled for 20 minutes and the pH then adjusted to 3.0 with citric acid. The mixture was boiled for 15 minutes, drained and rinsed with water for 20 minutes after which the final rinse water was drained off.

The container was refilled with 1500 parts water and then 2 parts of calcium chloride were added. The pH was adjusted to 3.5 with citric acid and the mixture boiled for 30 minutes after which time the pH was 4.0. The pH was then increased stepwise by adding sodium hydroxide solution in the following manner. During the first 10 minutes the pH was increased from 4.0 to 5.0 and during the next 10 minutes from 5.0 to 6.0. During the next 5 minutes the pH was increased from 6.0 to 7.0 and then maintained between 7.0 and 8.0 for the following 30 minutes. The cherries were then drained and rinsed with water for 20 minutes and the final rinse water drained off.

The container was refilled with 1500 parts water and boiled for 20 minutes. The cherries were drained and rinsed with water for 10 minutes after which the rinse water was drained off. The container was again refilled with water and 1 part of calcium chloride added. The pH was adjusted to 3.3 with citric acid and the mixture boiled for 20 minutes maintaining the pH at 3.3. The cherries were drained and rinsed with water for 10 minutes and the final rinse water drained off.

Finally the cherries were stored cooled in an equal amount of an aqueous solution containing 0.4% by weight citric acid, 0.15% by weight calcium chloride and 0.1% by weight sodium benzoate, all weights based on the weight of water. The pH was maintained at 3.

The cherries had a highly satisfactory red colour and there was no colour migration.

EXAMPLE 2

By following a similar procedure to that described in Example 1 but using 200 parts by volume of tea extract instead of the tannic acid there used, the dyed cherries obtained had a highly satisfactory red colour and there was no colour migration.

EXAMPLE 3

By following a similar procedure to that described in Example 1 but using 0.6 parts of instant tea powder instead of the tannic acid there used, the dyed cherries obtained had a highly satisfactory red colour and there was no colour migration.

EXAMPLE 4

By following a similar procedure to that described in Example 1 but instead of boiling with tannic acid for 1½ hours, the mixture was boiled for ½ hour and allowed to set overnight, the dyed cherries obtained had a highly satisfactory red colour and there was no colour migration.

We claim:

1. A process for artificially colouring fruit which comprises:
   (a) combining a pale-coloured fruit with from 0.5 to 4.0 parts by weight of water per part by weight of the fruit;
   (b) treating the fruit/water mixture with from 0.001% to 1.00% by weight of a colourant comprising a food acceptable pigment or dye containing carboxyl groups based on the weight of the fruit and with an effective amount of a hydrolysable tannin sufficient to fix the colourant in the fruit at a temperature of from 15° C. to the boiling point of the mixture;
   (c) lowering the pH of the mixture to at least a value at which the colourant becomes substantially insoluble;
   (d) raising the pH of the mixture such that the pH of the inner parts of the fruit does not exceed 7; and then
   (e) separating the coloured fruit from the mixture.

2. A process according to claim 1, wherein the hydrolysable tannin is tannic acid, tea extract or instant tea powder.

3. A process according to claim 1, wherein the fruit is treated with the hydrolysable tannin before the colourant is added.

4. A process according to claim 1, wherein the amount of pure hydrolysable tannin used is from 0.05% to 2.0% by weight based on the weight of the fruit.

5. A process according to claim 1, wherein the amount of colourant used is from 0.005% to 0.50% by weight based on the weight of the fruit.

6. A process according to claim 1, wherein the colourant is erythrosine.

7. A process according to claim 1, wherein after treatment with the colourant, the pH is lowered so that it has a value of from 3 to the pH at which the colourant becomes insoluble and the temperature is maintained at from 75° C. to the boiling of the mixture for a period of from 25 to 45 minutes at this reduced pH.

8. A process according to claim 1, wherein the raising of the pH takes place over a period of from 15 to 40 minutes at a temperature of from 75° C. to the boiling point of the mixture to a value not more than a pH of 8.

9. A process according to claim 1, wherein after the pH has been raised, it is lowered again to from 3.2 to 3.6 at a temperature of from 75° C. to the boiling point of the mixture before being stored at a pH of from 2.9 to 3.0.

10. A process according to claim 1 characterised in that the fruit consists of cherries which have been brined in an aqueous $SO_2$ medium.

* * * * *

UNITED STATES PATENT AND TRADEMARK OFFICE
CERTIFICATE OF CORRECTION

PATENT NO. : 4,442,104

DATED : April 10, 1984

INVENTOR(S) : Elaine R. Wedral, et al.

It is certified that error appears in the above—identified patent and that said Letters Patent is hereby corrected as shown below:

In the abstract, line 1, "wherein" should read -- characterised in that --.

Col. 4, line 3, "solid" should read -- sold --.

Col. 6, line 37, "characterised in" should read -- wherein --.

Col. 6, line 38, delete "that".

Signed and Sealed this

Seventh Day of August 1984

[SEAL]

Attest:

GERALD J. MOSSINGHOFF

Attesting Officer

Commissioner of Patents and Trademarks